UNITED STATES PATENT OFFICE.

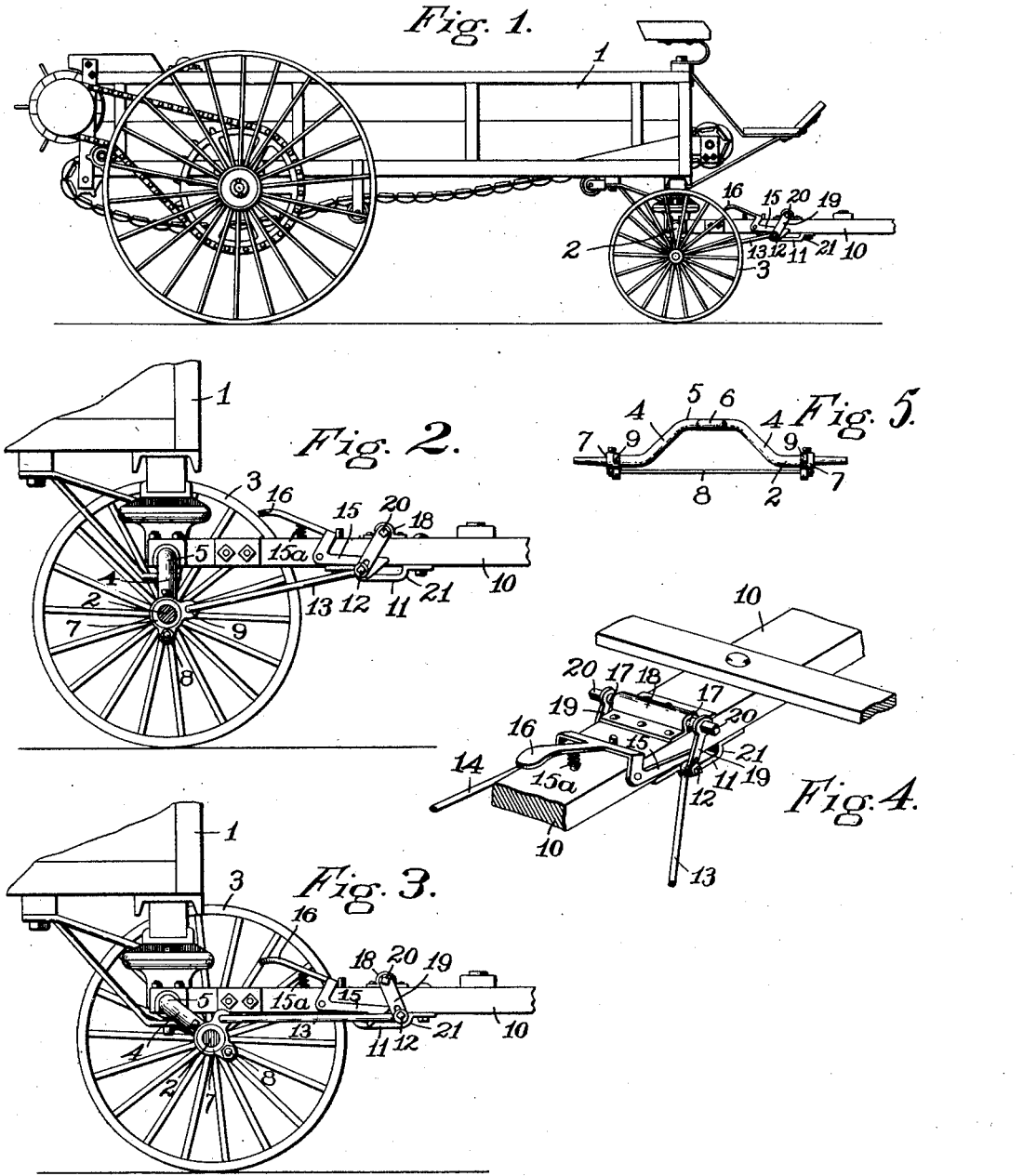

THEOPHILUS BROWN, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

APPARATUS FOR RAISING AND LOWERING VEHICLE-BODIES.

1,100,350.	Specification of Letters Patent.	Patented June 16, 1914.

Application filed January 22, 1910. Serial No. 539,613.

*To all whom it may concern:*

Be it known that I, THEOPHILUS BROWN, a citizen of the United States, residing at Worcester, in the county of Worcester and Commonwealth of Massachusetts, have invented a new and useful Improvement in Apparatus for Raising and Lowering Vehicle-Bodies, of which the following is a specification, accompanied by drawings forming a part of the same, in which—

Figure 1 is a side view of a manure spreader provided with my apparatus for raising and lowering the forward end of the body. Fig. 2 is a view on an enlarged scale from Fig. 1 of my apparatus with the forward end of the body in a raised position, one of the supporting wheels having been removed. Fig. 3 is a similar view to Fig. 2, showing the forward end of the body in a lowered position. Fig. 4 is a perspective view on an enlarged scale from Figs. 2 and 3 of a portion of the apparatus embodying my invention, and Fig. 5 is a detached front view on a reduced scale from Figs. 2 and 3 of the cranked forward axle of a vehicle.

Similar reference characters refer to similar parts in the different figures.

My invention relates to an apparatus comprising the forward axle of a vehicle arranged to provide for the raising and lowering of the front end of the vehicle, and it consists in the construction and arrangement of parts as hereinafter described and pointed out in the annexed claims.

In the accompanying drawings I have shown my invention as applied to a manure spreader, but it is applicable wherever it is desired to provide for raising and lowering the front end of a vehicle body.

Referring to the accompanying drawings, 1 is the body of a manure spreader with the forward end supported on an axle 2 and wheels 3. The axle 2, is bent upward at 4, 4 to elevate the central portion 5 which is preferably provided with a bend 6 to embrace the king pin. Collars 7, 7 are provided for the axle 2 just inside the wheels and are connected by a tie rod 8. Eyes 9 are also arranged upon the collars 7, 7 for a purpose later to be described. A tongue 10 is pivotally attached to the elevated portions of the axle 2 upon either side of the king pin by journal bearings inclosing the axle, by which the rotative movement of the elevated section of the axle with reference to the tongue is permitted. It is apparent from this construction of the axle 2 and tongue 10 that rearward movement of the tongue 10 with relation to the wheels 3 will carry the elevated portion 5 of the axle 2 from the position shown in Fig. 2 to that of Fig. 3, and this movement will be aided by the weight of the vehicle body as soon as the portion 5 is carried to the rear of the vertical plane of the axle 2. In this way the vehicle body may be lowered as desired for convenience in loading. To raise the body it is necessary only that the wheels 3 be held from turning while a forward movement is imparted to the tongue 10. The curvature of the axle 2 is so arranged that a slight force is sufficient to raise the vehicle body, and in most cases the wheels are held from turning by friction with the ground alone. The axle 2 is held in the elevated position by a locking device, shown enlarged in Fig. 4.

Beneath the tongue 10 is a plate 11 attached at its ends to the tongue and arranged to support a rod 12 transverse to the tongue and connecting the forward ends of rods 13 and 14, the rear ends of which are attached to the eyes 9 of the collars 7, 7 on the axle 2. The plate 11 is arranged to allow movement of the rod 12 for a limited distance parallel with the tongue 10. A pivoted latch 15 actuated by a spring 15ª is arranged to engage the rod 12 and hold it when in its rearmost position, which it assumes when the axle 2 is elevated, and prevent it from sliding forward, as shown in Fig. 2. Pressure on the lever 16 of the latch 15 will raise the latch 15 and release the rod 12, which is thereby permitted to move forward to the extent allowed by the plate 11 as the tongue 10 is moved backward, swinging the axle 2 from the position shown in Fig. 2 to the position shown in Fig. 3. The latch 15 is beveled so as to be raised by contact with the rod 12 to permit the return of the rod to its rearward position and to be automatically engaged by the latch 15.

A short shaft 17 is journaled on the upper side of the tongue 10 in the bearing 18 and is provided with radial arms 19, 19 at each end, the free ends of which are slotted and inclose the ends of the rod 12. The ends 20 of the shaft 17 are squared to receive a wrench in order to enable the shaft 17 to be rocked by hand to slide the rod 12 and, by a force applied through the rods 13 and 14 to the forward wheels, to rock the axle and swing its cranked section to either raise or lower the body. It is obvious that in case the motive power of the vehicle remains attached to the tongue, it may be utilized to accomplish the raising and lowering of the axle 2 without applying a wrench to the rod 12.

The operation of my improved device is as follows: When the parts are in the position of Fig. 2, movement of the tongue 10 with relation to the axle is prevented by the rods 13 and 14 held by the latch 15. When the latch 15 is released by pressure upon the lever 16, rearward movement of the tongue 10 with relation to the axle 2 is permitted by movement of the rear wheels in order to swing the cranked section of the axle rearwardly and lower the front end of the vehicle body. This brings the rod 12 connecting the rods 13 and 14 into contact with the forward curve 21 of the plate 11, as shown in Fig. 3. From this position the tongue 10 may be moved forward to raise the vehicle body, bringing the rod 12 again at the rear of the plate 11 and in engagement with the latch 15. Any means of moving the tongue 10 may be employed and I have shown in the shaft 17 and attached arms 19 means for operating the device by a wrench.

The use of a cranked axle for supporting a vehicle body, I am aware is not new, but the crown or cranked section has been rigidly held and incapable of a rotative movement in its connection with the body, so the axis of the supporting wheels journaled on the ends of the axle has been rigidly maintained in substantially the same vertical plane as the axis of the crown or cranked section 5. By my present improvement I also provide means for holding the axle from rotative movement relative to the body, but such holding means are capable of release to allow a free rotative movement to the crown or cranked section 5 within its bearings, and I also provide means by which the cranked section 5 may be rotated in one direction to carry its axis out of the vertical plane of the axis of the supporting wheels 3, 3, in order to lower the vertical body and rotated in the opposite direction to bring the two axes in the same vertical plane in order to again raise the vehicle body to its normal or elevated position.

I claim,

1. The combination with the cranked forward axle of a vehicle and forward wheels journaled on the ends of said axle, of a tongue pivoted upon said cranked axle, a collar upon either end of said axle within said wheels, rods connected with said collars, and a latch upon said tongue to engage the forward ends of said rods.

2. The combination with the cranked forward axle of a vehicle and forward wheels journaled on the ends of said axle, of a tongue pivoted upon said cranked axle, a collar upon either end of said axle within said wheels, rods connected with said collars, and means upon said tongue for moving said rods backward and forward, thereby rotating said cranked axle.

3. In a vehicle, a body, a cranked axle pivotally connected with said body, a tongue pivotally connected with the crank section of said axle, brace rods connected with said axle on opposite sides of its crank section and capable of a sliding movement parallel with said tongue, means for limiting the sliding movement of said brace rods, and means for holding said brace rods from a sliding movement.

4. In a vehicle, a body, a cranked axle pivotally connected with said body, a pair of supporting wheels journaled on the ends of said axle, a tongue pivotally connected with said axle, a shaft journaled on said tongue and connecting mechanism between said shaft and said axle for swinging said axle by the rotative movement of said shaft.

5. The combination with the axle of a vehicle and wheels journaled upon either end of said axle, said axle bent upward toward the center to raise the body of the vehicle above the axis of said wheels, of a tongue pivotally connected with the elevated portion of said axle, and means connecting said tongue with said axle for limiting rotative movement of said axle around the axis of said wheels.

6. The combination with the axle of a vehicle and wheels upon either end of said axle, said axle bent upward toward the center to raise the body of the vehicle above the axis of the wheels, of a tongue pivotally connected with the elevated portion of said axle, and locking means connected with said tongue for preventing rotative movement of said axle about the axis of said wheels.

Dated this eighteenth day of January 1910.

THEOPHILUS BROWN.

Witnesses:
PENELOPE COMBERBACH,
NELLIE WHALEN.

---

Copies of this patent may be obtained for five cents each, by addressing the "Commissioner of Patents, Washington, D. C."